US011978099B2

(12) United States Patent
Chandler

(10) Patent No.: US 11,978,099 B2
(45) Date of Patent: May 7, 2024

(54) PRIMARY PRODUCTION TRADING PLATFORM SYSTEM AND INTERFACE

(71) Applicant: PRIME X CONNECT PTY LTD, Sydney (AU)

(72) Inventor: Michael Chandler, Sydney (AU)

(73) Assignee: PRIME X CONNECT PTY LTD, Sydney (AU)

( * ) Notice: Subject to any disclaimer, the term of this patent is extended or adjusted under 35 U.S.C. 154(b) by 0 days.

(21) Appl. No.: 17/772,327

(22) PCT Filed: Oct. 27, 2020

(86) PCT No.: PCT/AU2020/051157
§ 371 (c)(1),
(2) Date: Apr. 27, 2022

(87) PCT Pub. No.: WO2021/081579
PCT Pub. Date: May 6, 2021

(65) Prior Publication Data
US 2022/0383367 A1  Dec. 1, 2022

(30) Foreign Application Priority Data
Oct. 28, 2019 (AU) ............................... 2019904044

(51) Int. Cl.
G06Q 30/00 (2023.01)
G06Q 30/0601 (2023.01)
(52) U.S. Cl.
CPC .............................. *G06Q 30/0601* (2013.01)
(58) Field of Classification Search
CPC ............................................. G06Q 30/06–08
See application file for complete search history.

(56) References Cited

U.S. PATENT DOCUMENTS

2012/0290553 A1\* 11/2012 England ............ G06Q 30/0282
707/706
2013/0246223 A1\* 9/2013 Mesaros ............ G06Q 30/0627
705/26.63
(Continued)

FOREIGN PATENT DOCUMENTS

WO        2015070690 A1     5/2015
WO    WO-2015070690 A1 \*   5/2015 ........... G06Q 10/107

OTHER PUBLICATIONS

"Purchasing Meat Exchange Draws Strong Response" (Purchasing 128:8 118) Reed Business Information, May 18, 2000 (https://dialog.proquest.com/professional/docview/1084820876?accountid=131444) (Year: 2000).\*
(Continued)

*Primary Examiner* — Ethan D Civan
(74) *Attorney, Agent, or Firm* — David D. Brush; Westman, Champlin & Koehler, P.A.

(57) ABSTRACT

Computer-based platforms and interfaces for trading a commodity such as primary production commodities, including meat, leather, grains, fruit, vegetables, flowers, seeds, living plants and timber. In particular, a user interface provides for input and output of data or information via an electronic screen. The interface has a text-based chat function for communication between a buyer and a seller, an order function allowing the buyer to order a first product from the seller, and a hyperlinking function to transform a keyword related to the product input by the buyer in the course of using the text-based chat function into a hyperlink actuatable by the buyer. When the buyer actuates the hyperlink, the order function presents an input option for the buyer to add the first product to an order by way of the order function.

8 Claims, 4 Drawing Sheets

(56) References Cited

U.S. PATENT DOCUMENTS

| | | |
|---|---|---|
| 2014/0089138 A1 | 3/2014 | Borders et al. |
| 2015/0294344 A1* | 10/2015 | Popomaronis ..... G06Q 30/0241 |
| | | 705/14.35 |
| 2017/0206554 A1 | 7/2017 | Craft |
| 2017/0256001 A1* | 9/2017 | Isaacson ................ G06Q 20/12 |
| 2018/0004724 A1 | 1/2018 | Ramesan |
| 2018/0218085 A1 | 8/2018 | Price et al. |
| 2019/0121909 A1 | 4/2019 | Dechu et al. |
| 2019/0230056 A1 | 7/2019 | Judd et al. |
| 2021/0035204 A1* | 2/2021 | Verma ................ G06F 16/9558 |

OTHER PUBLICATIONS

International Search Report dated Jan. 11, 2021, for corresponding PCT/AU2020/051157 filed on Oct. 27, 2020.
Written Opinion dated Jan. 11, 2021 for corresponding PCT/AU2020/051157 filed on Oct. 27, 2020.

* cited by examiner

PRIMARY PRODUCTION TRADING PLATFORM SYSTEM AND INTERFACE

The present application is a Section 371 National Stage Application of International Application No. PCT/AU2020/051157, filed Oct. 27, 2020 and published as WO 2021/081579 A1 on May 6, 2021, in English, which claims priority from Australian provisional patent application 2019904044, filed Oct. 28, 2019, the contents of which are hereby incorporated by reference in their entireties.

FIELD OF THE INVENTION

The present invention relates generally to computer-based platforms for trading a commodity. More particularly, the invention relates to platforms for the trade of commercial quantities of primary production commodities such as animal products (including but not limited to meat and leather), and plant products (including but not limited to grains, fruit, vegetables, flowers, seeds, seedlings, mature living plants and timber).

BACKGROUND TO THE INVENTION

Computerised trading platforms have allowed for direct interaction between primary producers and commercial buyers of primary production commodities. Such platforms have allowed primary producers and other parties (including wholesalers, agents and other intermediaries) seeking to sell primary production commodities to interact with potential buyers on an international basis.

In such platforms buyers and sellers may be matched automatically based on previously obtained information on each party, or by way of a manual search function. Matching may be based on attributes of the commodity concerned, commodity processing capabilities, certification associated with the commodity, quantity of commodity and the like.

In any event, where a potential buyer is matched to a potential seller the parties typically enter into an online discussion (typically via text-based interface) which may lead to a negotiation to establish mutually agreeable terms of sale. Such terms may include price, currency, payment terms, packaging, and shipping. Once agreement is reached a contract is digitally signed by the parties, and each party attends to its contractual responsibilities.

While prior art trading platforms are undoubtedly beneficial, certain problems present. One problem is that users find it laborious and time-inefficient to negotiate multiple sales. Typically, once a contract is finalised for a first product and the buyer or seller is seeking a further deal, the process of matching potentially suitable parties is recommenced, and the generation of a new contract repeated where the parties agree on terms.

In the primary production sector, Australian and New Zealand domestic and international sales of red meat alone equate to around $40 BN. Both markets operate on buyers and sellers initiating, negotiate and confirming contracts via a combination of telephone, fax, email, text, messaging platforms (such as WeChat™ and Whats App™) and spreadsheets. The sales workflow is manual and laborious, often requiring the double-entry of sales orders into third party applications. The existing workflow is further deficient as no single digitised audit trails is generated.

It is an aspect of the present invention to provide an improvement in prior art workflows so as to decrease the time or effort or inefficiency in negotiating and finalising contracts for the sale of a primary production commodity. It is a further aspect of the present invention to provide a useful alternative to prior art workflows.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides a user interface for input and output of data or information via an electronic screen, the user interface comprising: a text-based chat function configured to allow two-way communication between a buyer and a seller, an order function configured to allow the buyer to place an order for a first product with the seller, a hyperlinking function configured to transform a keyword related to the product input by the buyer in the course of using the text-based chat function into a hyperlink actuatable by the buyer, wherein where the buyer actuates the hyperlink, the order function presents an input option for the buyer to add the first product to an order by way of the order function.

There is provided in a second aspect of the present invention a user interface for input and output of data or information via an electronic screen, the user interface comprising: a text-based chat function configured to allow two-way communication between a buyer and a seller, an order function configured to allow the buyer to place an order for a first product and a second product with the seller, and a hyperlinking function configured to transform a keyword related to the second product input by the buyer in the course of using the text-based chat function into a hyperlink actuatable by the buyer, wherein where the buyer actuates the hyperlink, the order function presents an input option for the buyer to add a second product to an order held by the order function.

In one embodiment of the first or second aspect, the text-based chat function is configured to transmit text input by the buyer to a software-based keyword recognition module.

In one embodiment of the first or second aspect, the software-based keyword recognition module is configured to accept text input by the buyer and compare that text input against a keyword set, and where the text input by the buyer matches or otherwise correlates with a keyword of the keyword set the matched or correlated text input by the buyer is transformed into a hyperlink actuatable by the buyer.

In one embodiment of the first or second aspect, the user interface is configured such that where the hyperlink is actuated by the buyer the input option for the buyer to add a first product or a second product is presented with information associated with the first product or the second product.

In one embodiment of the first or second aspect, the information associated with the first product or the second product is any one or more of: description, price, payment options, quantity available, present inventory, presence or absence of a product-related certificate, location of second product, delivery time, delivery date, delivery options, delivery fee, delivery conditions, packaging options, presentation options.

In one embodiment of the first or second aspect, the user interface is configured such that the input option for the buyer to add a first product or a second product is actuatable by the buyer touching the electronic screen (where the electronic screen is a touch screen) or the buyer actuating a pointing device of a graphical user interface displayed on the electronic screen.

In one embodiment of the first or second aspect the user interface is displayed on a touch sensitive screen of an electronic device.

In a third aspect, the present invention provides a system comprising the user interface of any embodiment of the first aspect or second aspect, and an electronic seller database holding stored information on one or more products of a seller, wherein the system is configured such that the user interface is capable of displaying the stored information on one or more products of a seller.

In one embodiment of the third aspect, the stored information on one or more products of a seller is any one or more of: description, price, payment options, quantity available, present inventory, presence or absence of a product-related certificate, location of second product, delivery time, delivery date, delivery options, delivery fee, delivery conditions, packaging options, presentation options.

In one embodiment of the third aspect, the system comprises a user processor-enabled device which operates the user interface, wherein the electronic seller database is hosted on a server remote to the user processor-enabled device and the remote server is in network data connection with the user processor-enabled device.

In one embodiment of the third aspect, the electronic seller database is a catalogue database, an inventory database, an accounting or financial database, a logistics database, or a customer relations management database administered by the seller.

In one embodiment of the third aspect, the electronic database is a component of a third party electronic catalogue, an electronic inventory database, an electronic accounting or financial database, an electronic logistics database, an electronic enterprise resource planning database or an electronic customer relations management database.

In one embodiment of the third aspect, the software-based recognition module is executable on a user-processor-enabled device, or a remote processor-enabled device.

In one embodiment of the third aspect, the remote processor-enabled device is administered by a third party that is not a product buyer or a product seller.

In one embodiment of the third aspect, the remote processor-enabled device is a server in network communication with (i) a processor-based device of the user operating the user interface, and (ii) a processor-based device of the seller.

In a fourth aspect of the present invention there is provided a method of identifying and purchasing a product and transporting the purchased product from a storage facility of a seller to a buyer, the method comprising the steps of: the buyer identifying and purchasing a product of the seller using the user interface of any embodiment of the first or second aspects, or the system of any embodiment of the third aspect, and the seller generating a delivery label and affixing the label to the purchased product.

In one embodiment of the fourth aspect, the method comprises transporting the labelled product from the storage facility of the seller to the buyer.

In a fifth aspect, the present invention provides a method of buyer and seller communication by way of a user interface screen, the method comprising the steps of: at an electronic device comprising a touch-sensitive display: accepting a buyer input with regard to a product that is potentially supplied by a seller, displaying a user interface screen, accessing a database of a seller to determine whether or not the product is supplied the seller, and where the product is supplied by the seller, the user interface screen displaying a hyperlink configured to direct the buyer to information regarding the product.

In one embodiment of the fifth aspect, the user interface screen displays the user interface of any embodiment of the first aspect.

BRIEF DESCRIPTION OF THE FIGURES

Unless otherwise indicated herein, features of the drawings labelled with the same numeral are taken to be the same features, or at least functionally similar features, when used across different drawings.

Figure 1:
FIGS. 1 through 5 illustrate a preferred user interface of the present invention showing sequential steps in a transaction between a buyer and a seller of a meat product.

The drawings are not prepared to any particular scale or dimension and are not presented as being a completely accurate presentation of the various embodiments.

DETAILED DESCRIPTION OF THE INVENTION AND PREFERRED EMBODIMENTS THEREOF

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments, or indeed any embodiment covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

The present invention is predicated at least in part on the discovery that workflows involved in negotiating and finalising a sale of a primary production commodity is greatly simplified where a chat function of a communication application is integrated with a hyperlinking function for keywords, and also an ordering function. Thus, a buyer and a seller in existing communication via a chat function are able to identify a product sold by the seller and which the buyer may wish to buy, negotiate terms and then settle a transaction by placement of an order by the buyer all within a single interface. The interface may allow the buyer to place an order for a first product, and optionally to continue using the chat function with the seller so as to identify a second product (or even a third, fourth, fifth or further products) which may be negotiated and added to the order of the first product.

The present invention obviates the need for a buyer and seller to communicate on one platform (such as an internet-based chat app, or email, or telephone or facsimile) to negotiate terms of a purchase, whilst at the same time the buyer being able to view a seller's available products of interest in the course of a chat session, and furthermore on the same platform settle a contract to buy.

The present interface comprises a chat function of the type already familiar to the skilled person which allows a two-way communication between two users (in the present case between a potential buyer and a potential seller). Such function allows for the communicating parties to send messages and receive messages in a to-and-fro manner such as would be the case in a verbal conversation. In the context of the present invention, the chat function provides a record of any discussions, agreements, or disagreements between the parties that may be retrieved at a later date to prove or disprove an allegation. As will be appreciated from later disclosure herein, the conversation record may be associated with other functions of the interface such as those associated with the settlement of a sale such as electronic contract signing, order generation, invoice generation, payments and the like.

The present interface has the ability to display a hyperlink to the buyer for a product keyword. For example, the buyer may ask via the chat function whether the seller has a particular cut of meat. In industry terms, many product descriptors are widely adopted and where a certain product descriptor is entered into the chat function that descriptor may be presented as hyperlink of the word on the chat function. The term "hyperlink" as used within the context of the present invention is not intended to be limited to the familiar underlined blue font often used for such a purpose. The hyperlink may take the form of a different from the surrounding text, different colour, different background, the addition of a character nearby the keyword (such as an asterisk or a dollar sign), the addition of text nearby the keyword (such as "product available", or "add to order"), the addition of a graphic (such as a tick), or the addition of a functional interface component (such as a "radio button"). Given the benefit of the present invention the skilled person will be capable of conceiving of other means to highlight a product keyword so as to convey to the buyer that a certain product is supplied by the seller, and all such means are included in the ambit of the invention.

As will be appreciated, for a product keyword to be displayed as a hyperlink on the present interface it must first be matched or correlated to a product that is supplied by the seller. The matching or correlation may be performed by software different to that which operates the user interface. The matching or correlating software is preferably executed on a third party server which is able to extract product information from a database of the seller, receive text input by the buyer via the chat function of the interface and determine whether or not any word input by the buyer matches or correlates with any product provided by the seller. For example, the seller may sell a range of beef cuts: chuck, rib, loin, round, flank, short plate, brisket and shank. These are well-used industry terms and it would be expected that a buyer would use such terms (or similar terms) when asking if a seller has a particular cut via the chat function.

The matching or correlation of each word input into the chat function of the interface may be performed against a list of product descriptors provided by or otherwise derived from the seller. Typically, the seller will administer an electronic database having stored therein an entry for each product available for sale. Thus, where a word (in reality a first string) entered by the buyer exactly matches with a word (in reality a second string) of the seller's database then that word is presented as a hyperlink on the user interface.

In some embodiments, the matching or correlation function may incorporate a lexicon configured to provide a more sophisticated, versatile or useful search functions. Such a lexicon may be established by the seller, but will more typically be managed by a third party having expertise in such matters, and operate as an adapter between buyer input and seller product. The lexicon may comprise standard terminology for naming things (proper nouns), abbreviations for those things, acronyms, synonyms and alternative spellings. For example, beef shank may be known to some users as "gravy beef" (without the bone) or "osso buco" (with the bone). Thus, the lexicon may list all three terms as synonyms such that the words "gravy beef" in the chat function will be presented as a hyperlink where the seller database contains an entry for beef shank.

The lexicon may also comprise verbs related to a product. As one example, the lexicon may include the word "stewing" as a synonym for all collagen-rich beef cuts such as "chuck" and "oxtail".

Thus, the software-based keyword recognition module may be configured by software means to provide a search engine capable of matching or correlating terms that are the 'same as' and those that are 'similar to' or that are 'related to' a lexicon entry or user input word. The rules determining these relationships are typically encoded in the module software by algorithmic means or via a simple electronic lookup table.

Search terms of the lexicon may be augmented by additions entered by a system administrator or because a user has previously searched by a term that the present system identified as not being in the lexicon.

The lexicon administrator (or other appropriately trained and authorized individual) is enabled by way of administrator interface to insert new words or terminologies, acronyms, synonyms and so on, to the lexicon, or approve or not approve words or terms that the system has identified as not being currently in the lexicon but which users have entered as queries.

The lexicon may comprise generic terms that are shared by all participants in an industry. In embodiments of the present system configured as a centrally hosted subscription arrangement ("software as a service"), lexicon terms may be shared by all users of the system in a cross-user manner. A set of lexicon entries may pre-exist in the present system, with further entries allowed to be added by a user or administrator over time and in accordance with terminology typically used in the industry.

The interface may be generated and presented by way of application software of the user's processor-enabled device. Alternatively, the interface is presented in a browser window (such as Firefox™, Chrome™, Edge™ or Safari™) displayed on the buyer's processor-enabled device Reference is now made to preferred embodiments which are further described in some forms by reference to the attached drawings.

Turning to FIG. 1, there is shown a chat interface (10) presentenced on the screen of an Internet-connected computer of a buyer. As will be clear from subsequent drawings of the interface a seller is involved in the chat session and will therefore be presented with a similar interface (at least with respect to the chat function) on an Internet-connected computer.

In this embodiment, the buyer and seller have previously negotiated an order for beef trimmings, with FIG. 1 showing closing comments by the buyer. The existence of a previous order is not an essential feature of the invention, with the invention being entirely operable where the interface is utilized to generate an order de novo.

In the interface (10) of FIG. 1, the buyer has considered that the seller may have another product (being beef briskets) and has enquired as such via the interface (10). In many circumstances, a buyer will generally prefer to obtain product from a single seller rather than from multiple sellers. Motivations for dealing with a single seller may relate to the possibility of discounts for ordering multiple products, or for the purpose of keeping payment and logistics simple.

The interface has, or is connected to a software-based keyword recognition module having a programmed lexicon. Each word typed into the chat function by the buyer is transmitted to the keyword recognition module and compared with lexicon-accepted keywords. In this embodiment of the present invention, the seller is a supplier of meat products and accordingly the keywords will cover some, most or all of meat products supplied in that industry. In this embodiment, the buyer and seller are connected to each other via a third party platform server and the keyword recognition module is stored on and is operated by the third party platform server. The keyword lexicon is maintained by a human or artificially intelligent electronic administrator of the third party platform who/that attempts to ensure that appropriate keywords are used as a comparator in the keyword recognition module. For example, whilst every know cut of meat would form part of the lexicon, irrelevant words such as "glad" (as used by the buyer in the course of the chat session) would not be part of the lexicon.

In the example of FIG. 1, the keyword recognition module recognises the term "beef briskets", being a meat product that is sold by at least some sellers participating in the platform. The keyword recognition module then instructions a product search module stored on and executed by the third party platform server to check the inventory of the seller for any available stock of beef briskets. Typically, the platform server is in network communication with an inventory database (directly or indirectly) of the seller which is updated in real time and therefore an accurate reflection of stock at hand held by the seller and available for sale.

The keyword recognition module transmits instruction to the user interface (10) to display the term "beef briskets" in bold font which is also underlined, so as to appear as a hyperlink. As a frequent user of the platform, the buyer understands that the hyperlinking in the chat function of the term "beef briskets" means that the seller has that product available for purchase.

Where a keyword is recognised, but interrogation of the seller inventory database shows no available stock, then the product search module does not instruct the interface (10) to alter the appearance of a term "beef briskets" to a hyperlink given that the seller is unable to supply that product. In an alternative embodiment of the invention, the product search module may check with a product catalogue database of the seller to ascertain whether or not the seller may nevertheless be able to supply the relevant product (beef briskets in this example) at some time in the near future. The seller may include a field in the product catalogue database detailing a projected supply date or a lead team for product supply, such information being conveyed via a window (not shown) for consideration by the buyer via the user interface (10).

Figure 2:
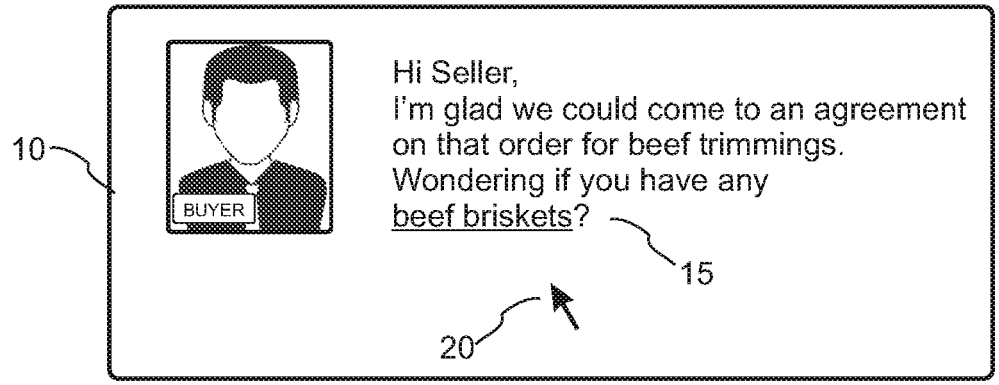
Figure 3:
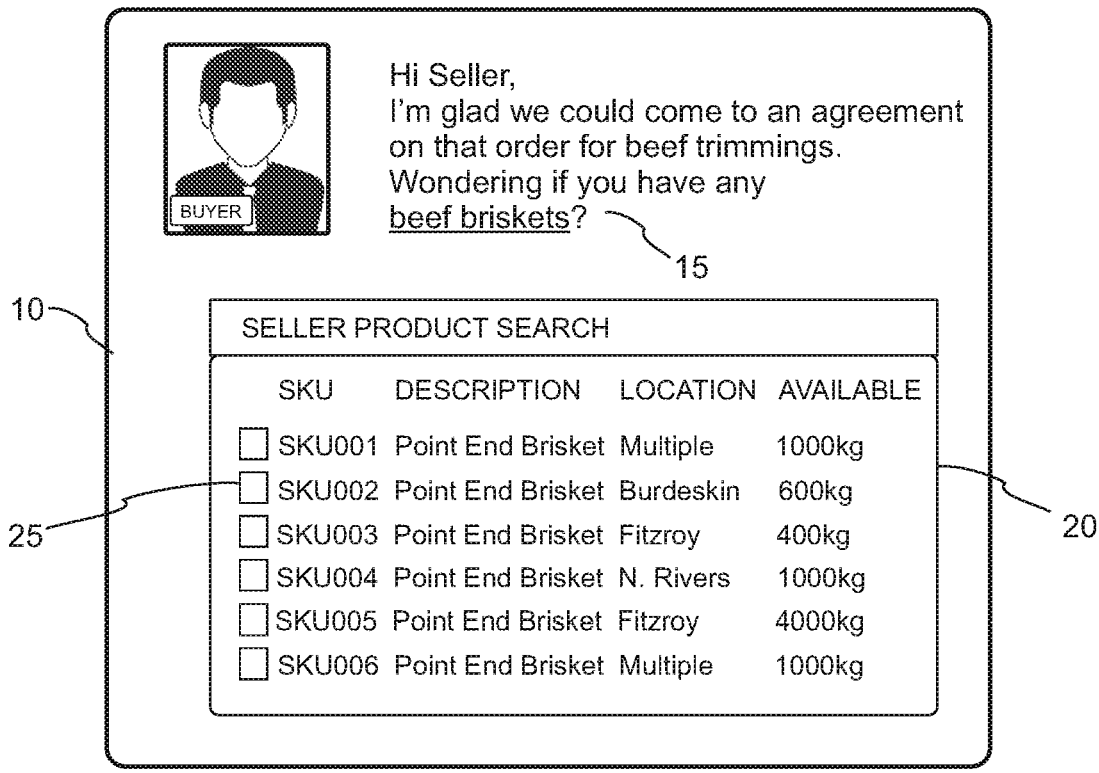
Figure 4:
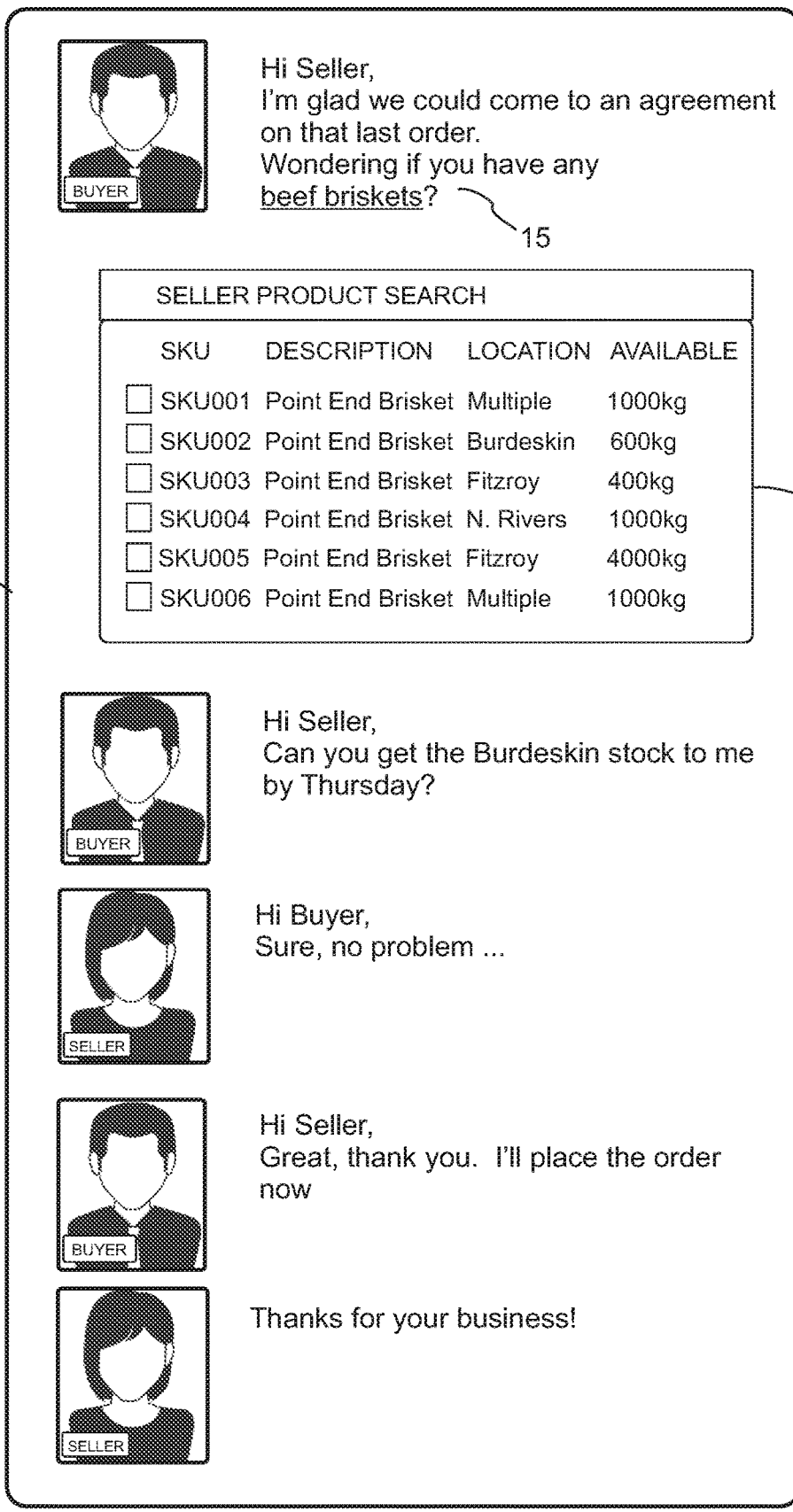

Returning to the exemplified circumstance whereby the seller has the desired product in stock and ready for delivery, as shown at FIG. 2 the buyer uses the mouse of computer graphical user interface to move the arrow (20) over the term "beef briskets" and selecting same with the mouse button. This act of selection reflects the desire of the buyer to obtain details of the products held by the seller, and the possible intention to purchase. Upon selection, the user interface transmits an instruction to the third party platform server to retrieve all entries for beef briskets held by the seller inventor database, and store the entries temporarily in electronic memory of the third party platform server. The entries are subsequently transmitted from the third party platform server to the buyer's computer for display on the user interface (10).

As shown in FIG. 2, a product display window (20) is presented to the buyer, listing all beef brisket products supplied by the seller. As will be noted, the product is in various locations and available in varying quantities. The product display window (10) further comprises radio buttons (one marked 25) allowing the buyer to select (and optionally de-select) any one or more of the various products listed in the window (10). Selection of a particular product signifies the buyer's intention to purchase that product.

Having reviewed the products on offer, the buyer considers the 600 kg lot stored at Burdekin to be appropriate. The chat function of the user interface (10) remains operable at this time allowing the buyer and seller to converse in text regarding the potential sale. In the exemplified embodiment, the buyer wishes to know whether the seller is able to dispatch the Burdekin product so as to be delivered by a certain day. The seller confirms via the chat function that the required delivery day is achievable. In reality, the conversation between buyer and seller at this point will be more complex and may involve discussions around quality, price, packaging, delivery, certification, insurance, payment terms and the like.

In the course of the discussions, either user or seller may upload a document via the interface (10) for display on the other party. For example, a buyer may request proof on a certificate in proof of a claimed organic status of the meat. A seller may request a document be uploaded as proof that the buyers has sufficient funds to pay for a purchase before agreeing to the sale is agreed to. The interface may therefore comprise an "upload" button, actuation of which by the user opens a window allowing browsing to a file stored on the user's computer. Upon identification of the relevant file (such as a PDF or an image file) the user actuates a further button (such as an "OK" button) causing a copy of the file to be transmitted to a third party platform computer server and retained in electronic memory thereof. The third party platform computer server subsequently transmits a copy of the file to the computer presenting the interface to the other party, where the file is saved into electronic memory. The interface is then instructed by the third party platform server to display the file on the other party's screen for review, or at least make the file available for access via the interface.

Conveniently, uploaded documents may be immediately viewable within the interface or by actuation of a button on the user interface optionally with the assistance of embedded or associated software (such as a PDF viewer, or an image file viewer).

Figure 5:
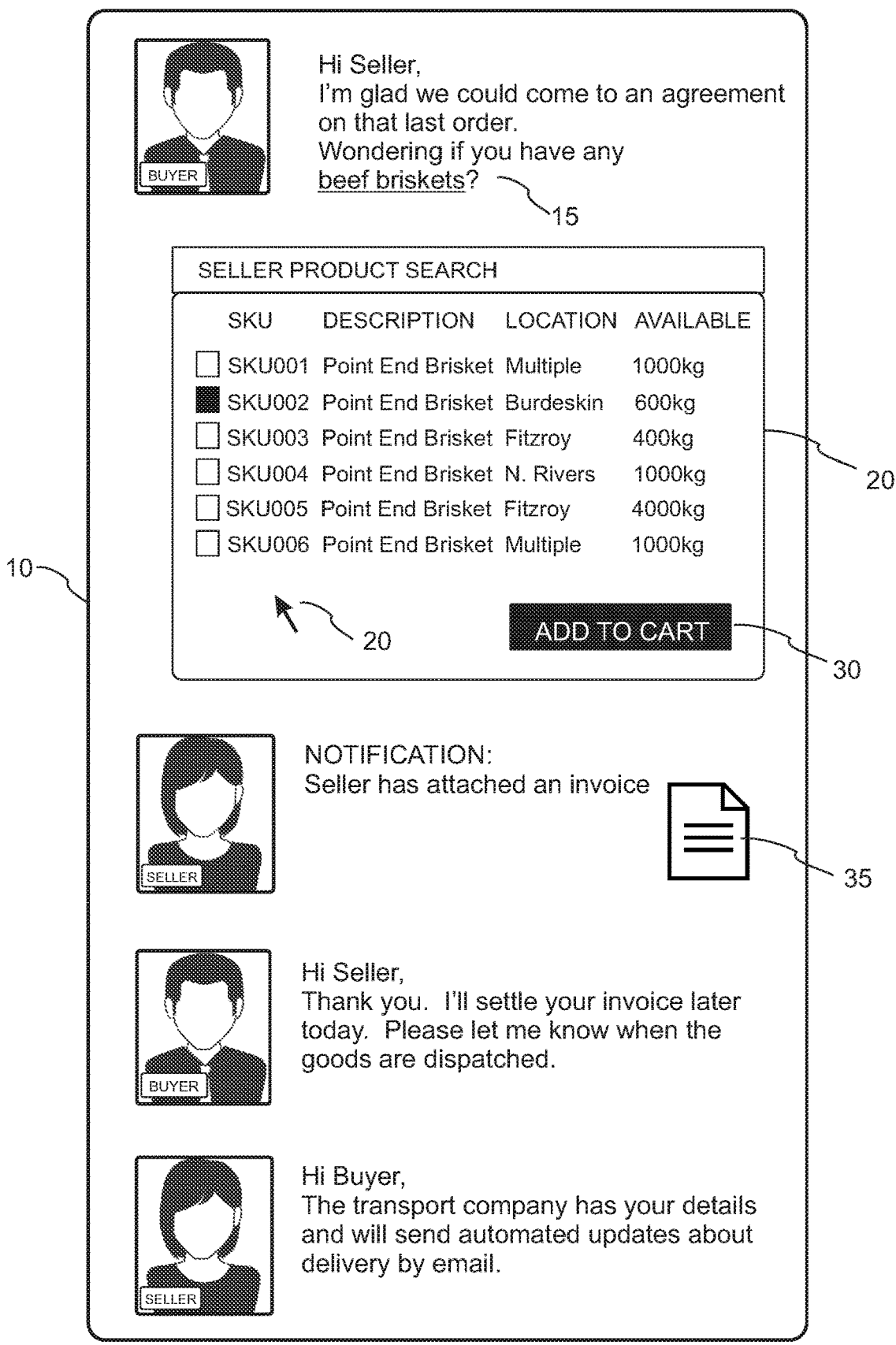

Only where the buyer and seller are satisfied with the discussed conditions of the sale will the buyer select a product for purchase. As shown in FIG. 5, the buyer selects the desired product using the pointer (20) of the computer graphical user interface, which causes the "add to cart" button (30) to appear. Actuating the "add to cart" button generates a new order via an order module (typically stored and operated by a third party platform server), or adds the selected product to an existing order.

The interface will generally be capable of displaying a "cart" window and when the buyer completes selects all desired products is able to finalise the order by actuating a "confirm" button on the "cart" window. Actuation of the "confirm button" will generally be transmitted to the third party platform server, which in turn may dispatch electronic notification (via a user interface or otherwise) to the seller that the order has been placed. At that time, the seller may generate a contract of sale and/or an invoice for payment. The contract of sale may be capable of electronic signature and may optionally be displayable by the user interface used by the buyer and/or seller. The invoice may be displayable by the user interface used by the buyer.

Reference is made to FIG. 5 whereby a document icon (35) represents the availability of an invoice for viewing and/or downloading by the buyer. The invoice may have been manually or automatically generated by the seller and uploaded to the third party platform server, or may be automatically or manually generated by the third party platform server based on information input into the interface by the buyer and/or seller in the course of negotiating the sale via the chat function of the interface.

Actuation of the "confirm" button in the cart window of the interface (10) may further cause transmission of an instruction to the third party platform server to update the seller inventory database to remove the products just purchased. In that regard, it will be understood that the seller will have granted access to the inventory database not only to read database contents, but to also write to the database. Where write permission is not granted, the seller may remove product from its database manually. In any event, the purchased product is no longer offered to a later buyer.

It will be appreciated that the present interface may function as means for faithfully recording a transaction between a buyer and a seller. The contents of the chat may be electronically recorded and also any documents exchanged between buyer and seller. If need be, where there is disagreement between the parties at a later dates, record of the transaction may be reviewed to clarify any contentious issues. The electronic record may be stored on the third party platform computer, and not be available for modification or other interference by buyer or seller.

Where the third party platform server (including any associated software) requires access to a database or other component of the seller's system, such integration may be a full integration whereby the seller's system is integrated in the third party software stack. As an alternative, the seller's system and third party system may remain essentially discrete with information interchange (simplex or duplex) being provided by way of application programming interface (API).

An advantage of embodiments having access to a dynamic database of the seller is that seller related information (such as product description, product availability, lead times, packaging options, currency of certifications and permits, delivery times and the like) are always current. Real time updating is preferred such that product that has been sold and that is recognised by the keyword recognition module is not hyperlinked in any chat text of the interface.

The seller database may be of any type capable of performing the functions described herein. Generally, the database is of the relational type, such as Advantage Database Server, Altibase, Apache Derby, Cubrid, Datacom, DB2, Drizzle, Empress Embedded Database, FileMaker, Firebird, HSQLDB, H2, Informix Dynamic Server, Ingres, InterBase, LucidDB, MAriaDB, MaxDB, Microsoft Access, FoxPro, Microsoft SQL Server, MonetDB/SQL, mSQL, Nexusdb, Omnis Studio, OpenLink Virtuoso, Oracle, Oracle, Rdb, Paradox, Peoplesoft, Pervasive PSQL, Polyhedra DBMS, Postgre SQL, RDM embedded, RDM server, SAP, ScimoreDB, smallSQL, SQL Anywhere, SQL Base, SQLite, Unidata and Xeround Cloud Database.

The seller database is one that is ordinarily in place in the organization for the handling of product or the administration of logistics. For example, the database may be part of an inventory management system, and for larger organizations may be part of an enterprise resource planning system (such as SAP™). In some embodiments, the invoice management system includes or is associated with order management software.

Exemplary inventory management software operable in the context of the present invention includes: EMS Barcode Solutions, Flowtrac, Capterra, JustFood ERP, ProducePro, NetSuite (Oracle), TradeGecko, Cin7, Unleashed, Xero, Quickbooks, Katana, Zoho, Vend, Harmoniq, StockTrim.

Any database of the invention may be embodied in the form of cloud storage (which may be hosted by a third party, albeit with a security layer to ensure privacy). Certain system components, most, or substantially all of the components including servers, software, processors and the like may be cloud-based. For example, the inventory management system may be configured at least in part in a "software as a service" format.

Figure 6:
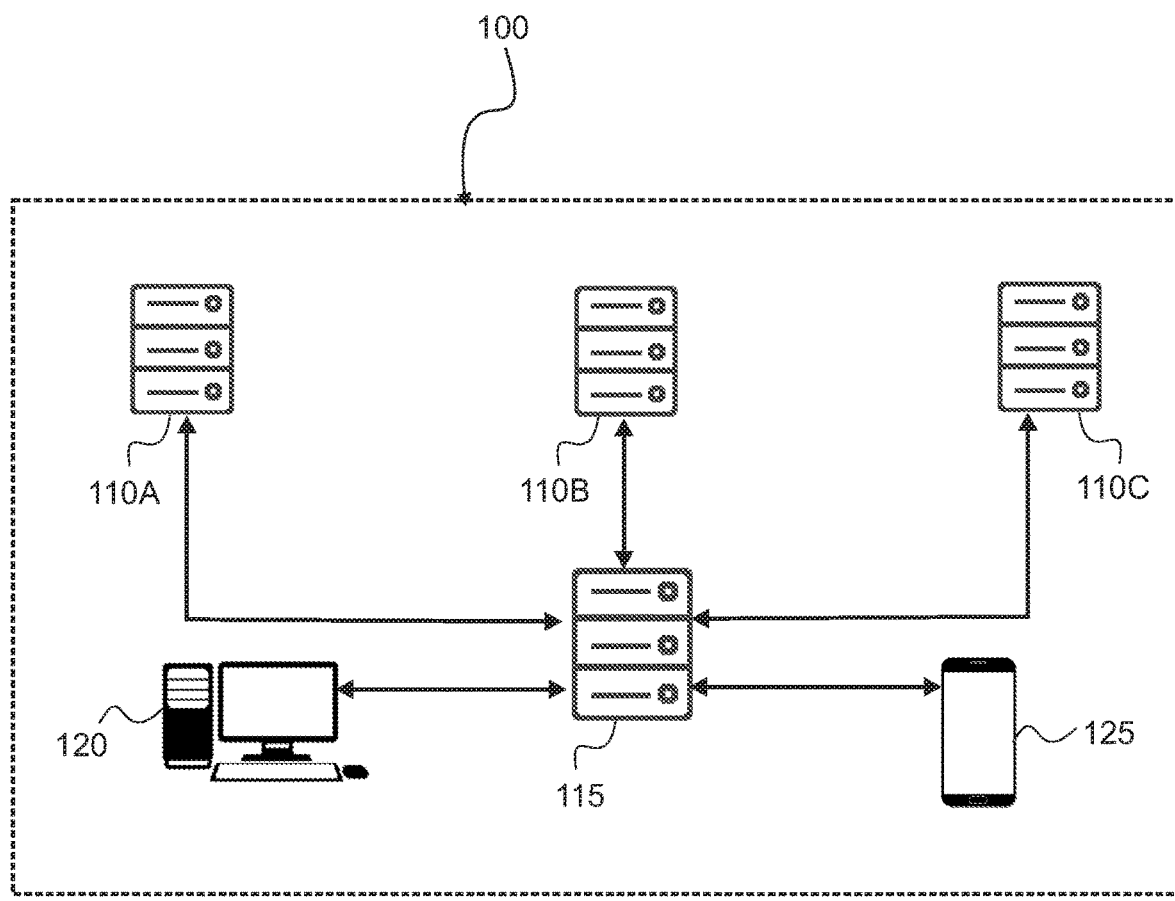
FIG. 6 is a block diagram of a preferred system of the present invention, comprising a platform server, severs of three independent sellers, a computer of a first buyer and a smart phone of a second buyer. A transaction generally occurs between only a single seller and a single buyer.

An exemplary system (100) of the present invention is shown at FIG. 6. The system comprises computer servers (110A) (110B) (110C) of each of a first, second and third seller of a meat product. Each of the servers (110A) (110B) (110C) is in operable computer network communication (duplex) with a third party platform server (115) via the Internet.

The platform server (115) is administered by a third party corporate entity that is responsible for the overall running of the platform which in broad terms is designed to act as a virtual market place connecting buyers and sellers. The server (115) acts as an interchange for messages sent and received by the chat function of the interface used by buyers and sellers. The server (115) stores and executes the software-based keyword recognition module, and any accessory modules such as an ordering module, invoice generation module, contract generation module etc. Although the drawings show a single server, it is of course possible for server functions to be distributed across multiple hardware or virtual servers.

FIG. 6 shows the connection of a personal computer (120) of a first buyer and a smart phone (125) of a second buyer in operable computer network communication (duplex) with the platform server (115). The user interface of the present invention (such as that marked 10 in the earlier drawings) is displayed on the screen of the computer (120) or smart phone (125), and acts a means of data input and output, control the uploading and downloading of files, and the transmission and reception of instructions from or to the platform server (115).

The interface displayed to the seller (not shown) is displayed on a personal computer, smart phone or other device. Functions of the seller interface are generally comparable to those of the user interface with the exception of the keyword hyperlinking function and ordering function which of course are not required.

Typically, where instructions or data are transmitted between remote processor-enabled devices (such as servers, user personal computers, mobile devices, and the like) transmission occurs via the Internet by way of protocols well understood by the skilled person.

A network may be established in whole or part by wired means, such as twisted pair wire, computer networking cabling (wired Ethernet as defined by IEEE 802.3), coaxial cable, ITU-T G.hn technology, optical fiber. The term "wired" and its derivatives may be used to describe circuits, devices, systems, methods, techniques, communications channels, etc., that may communicate data through the use of modulated electromagnetic radiation through a solid medium. In addition or alternatively the network may be implemented by wireless means including terrestrial microwave, communications satellite, cellular and PCS systems, radio and spread spectrum technologies such as WiFi™ protocols. In the context of this document, the term "wireless" and its derivatives may be used to describe circuits, devices, systems, methods, techniques, communications channels, etc., that may communicate data through the use of modulated electromagnetic radiation through a non-solid medium.

The network may implement any suitable communications protocol including an ethernet protocol, TCP/IP (including IPv4 and IPv6), Synchronous Optical Networking (SONET) and Synchronous Digital Hierarchy (SDH).

The interface or other aspects of systems of the present invention may in the physical form of a computer-readable medium comprising. The medium may be in the form of random access memory, magnetic hard drive, optical medium, or SSID for example. The computer-readable carrier medium may carry a set of instructions, e.g., a computer program for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method as described herein. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Data or instructions may be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers). The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

It will be understood that the steps of any method disclosed herein may be performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

While the present invention has been disclosed mainly by reference to the sale of meat products, the invention is nevertheless applicable to other animal products (such as hides and feathers), and also to plant products (such as grains, fruit, vegetables, flowers, seeds, seedlings, and mature living plants).

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following are hereby expressly incorporated into this Summary section, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A system comprising:
   (a) a user interface for input and output of data or information via an electronic screen, the user interface comprising:

a text-based chat function configured to execute a two-way communication between a buyer and a seller, the text-based chat function comprising at least one window of a chat between the buyer and the seller for display on the electronic screen, an order function configured to allow the buyer to place an order for a primary production product with the seller through the at least one window of the text-based chat function, and a hyperlinking function that recognizes a keyword related to a primary production product input by the buyer within the at least one window in the course of using the text-based chat function and transforms the keyword into a hyperlink actuatable by the buyer within the at least one window of the text-based chat function, wherein in response to the buyer actuating the hyperlink, the order function presents within the at least one window of the text-based chat function an input option for the buyer to add the primary production product subject of the hyperlink to an order by way of the order function, and a non-transitory computer-readable medium comprising an electronic seller database stored thereon and holding stored information on an available quantity of one or more primary production products of a seller, wherein the user interface simultaneously displays within the at least one window the primary production product subject of the hyperlink, the available quantity of the one or more primary production product of the seller and that is subject of the hyperlink, and the input option for the buyer to add the primary production product subject of the hyperlink to an order.

2. The system of claim 1, wherein the user interface displays further stored information on the primary production product subject of the hyperlink, wherein the further information comprises any one or more of: description, price, payment options, present inventory, presence or absence of a product-related certificate, location of second product, delivery time, delivery date, delivery options, delivery fee, delivery conditions, packaging options, presentation options.

3. The system of claim 2, comprising a user processor-enabled device which operates the user interface, wherein the electronic seller database is hosted on a server remote to the user processor-enabled device and the remote server is in network data connection with the user processor-enabled device.

4. The system of claim 1, wherein the electronic seller database is a catalogue database, an inventory database, an accounting or financial database, a logistics database, or a customer relations management database administered by the seller.

5. The system of claim 1, wherein the electronic database is a component of a third party electronic catalogue, an electronic inventory database, an electronic accounting or financial database, an electronic logistics database, an electronic enterprise resource planning database or an electronic customer relations management database.

6. The system of claim 1, wherein the system comprises a user-processor-enabled device or a remote processor-enabled device, and wherein the text-based chat function is configured to transmit text input by the buyer to a software-based keyword recognition module, the software-based recognition module being executable on the user-processor-enabled device or on the remote processor-enabled device.

7. The system of claim 6, wherein the system comprises the remote processor-enabled device, and the remote processor-enabled device is administered by a third party that is not a product buyer or a product seller.

8. The system of claim 6, wherein the system comprises the user-processor-enabled device and the remote processor-enabled device, and the remote processor-enabled device is a server in network communication with (i) the user-processor-enabled device of the user operating the user interface, and (ii) a processor-based device of the seller.

* * * * *